(12) United States Patent
Koue

(10) Patent No.: US 9,083,827 B2
(45) Date of Patent: Jul. 14, 2015

(54) RELAY DEVICE, FACSIMILE COMMUNICATION METHOD, AND RECORDING MEDIUM

(71) Applicant: FUJI XEROX CO., LTD., Tokyo (JP)

(72) Inventor: Toshiaki Koue, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/010,671

(22) Filed: Aug. 27, 2013

(65) Prior Publication Data

US 2014/0268248 A1   Sep. 18, 2014

(30) Foreign Application Priority Data

Mar. 12, 2013   (JP) .................................. 2013-049544

(51) Int. Cl.
*G06F 3/12* (2006.01)
*H04N 1/00* (2006.01)
*H04N 1/32* (2006.01)

(52) U.S. Cl.
CPC ......... *H04N 1/0022* (2013.01); *H04N 1/32117* (2013.01); *H04N 1/32411* (2013.01); *H04N 2201/0093* (2013.01); *H04N 2201/0094* (2013.01); *H04N 2201/3219* (2013.01); *H04N 2201/3278* (2013.01)

(58) Field of Classification Search
CPC ......... H04N 1/00127; H04N 1/00129; H04N 1/32523; H04N 1/32406; H04N 1/32411; H04N 1/209; H04N 2201/0039; H04H 20/86; H04H 20/00; H04H 20/02
USPC .......... 358/1.15, 405, 407; 709/202, 207, 240
See application file for complete search history.

(56) References Cited

U.S. PATENT DOCUMENTS

| | | | |
|---|---|---|---|
| 4,994,926 A * | 2/1991 | Gordon et al. | 358/400 |
| 5,050,208 A * | 9/1991 | Wada | 379/100.09 |
| 6,130,757 A * | 10/2000 | Yoshida et al. | 358/1.15 |
| 7,177,936 B1 * | 2/2007 | Ejiri | 709/228 |
| 2002/0075520 A1 * | 6/2002 | Adegawa | 358/402 |
| 2002/0075521 A1 * | 6/2002 | Oobayashi | 358/402 |
| 2006/0271936 A1 * | 11/2006 | Matsuda et al. | 718/102 |

FOREIGN PATENT DOCUMENTS

JP   A-2006-222635   8/2006

* cited by examiner

*Primary Examiner* — Jamares Q Washington
(74) *Attorney, Agent, or Firm* — Oliff PLC

(57) ABSTRACT

A relay device includes a receiver that receives multiple facsimile transmission instructions via a private network from a client device that does not include facsimile transmitting functions, a facsimile communication unit that sequentially transmits facsimiles externally via a public network, on the basis of the multiple facsimile transmission instructions received by the receiver, a creator that creates communication result information regarding communication when the facsimile communication unit transmitted facsimiles, before the facsimile communication unit completes facsimile transmission for all of the multiple facsimile transmission instructions, and a transmitter that transmits the communication result information created by the creator to the client device from which the receiver received facsimile transmission instructions.

10 Claims, 10 Drawing Sheets

FIG. 4

| BROADCAST NUMBER | 1/20 | 2/20 | 3/20 | 4/20 | ... |
|---|---|---|---|---|---|
| FAX DESTINATION | 03-1234-5678 | 045-678-9999 | 03-1234-9999 | 03-1234-5678 | ... |
| COMMUNICATION RESULT | OK | OK | NG | CALLING | ... |
| PAGES | 5 | 5 | 3 | 2 | ... |

113a

RELAY DEVICE, FACSIMILE COMMUNICATION METHOD, AND RECORDING MEDIUM

CROSS-REFERENCE TO RELATED APPLICATIONS

This application is based on and claims priority under 35 USC 119 from Japanese Patent Application No. 2013-049544 filed Mar. 12, 2013.

BACKGROUND

Technical Field

The present invention relates to a relay device, a facsimile communication method, and a recording medium.

SUMMARY

According to an aspect of the invention, there is provided a relay device including a receiver that receives multiple facsimile transmission instructions via a private network from a client device that does not include facsimile transmitting functions, a facsimile communication unit that sequentially transmits facsimiles externally via a public network, on the basis of the multiple facsimile transmission instructions received by the receiver, a creator that creates communication result information regarding communication when the facsimile communication unit transmitted facsimiles, before the facsimile communication unit completes facsimile transmission for all of the multiple facsimile transmission instructions, and a transmitter that transmits the communication result information created by the creator to the client device from which the receiver received facsimile transmission instructions.

BRIEF DESCRIPTION OF THE DRAWINGS

Exemplary embodiments of the present invention will be described in detail based on the following figures, wherein:

FIG. 4 is a diagram illustrating an exemplary structure of communication result information;

DETAILED DESCRIPTION

First Exemplary Embodiment

Configuration of Communication System

Figure 1:
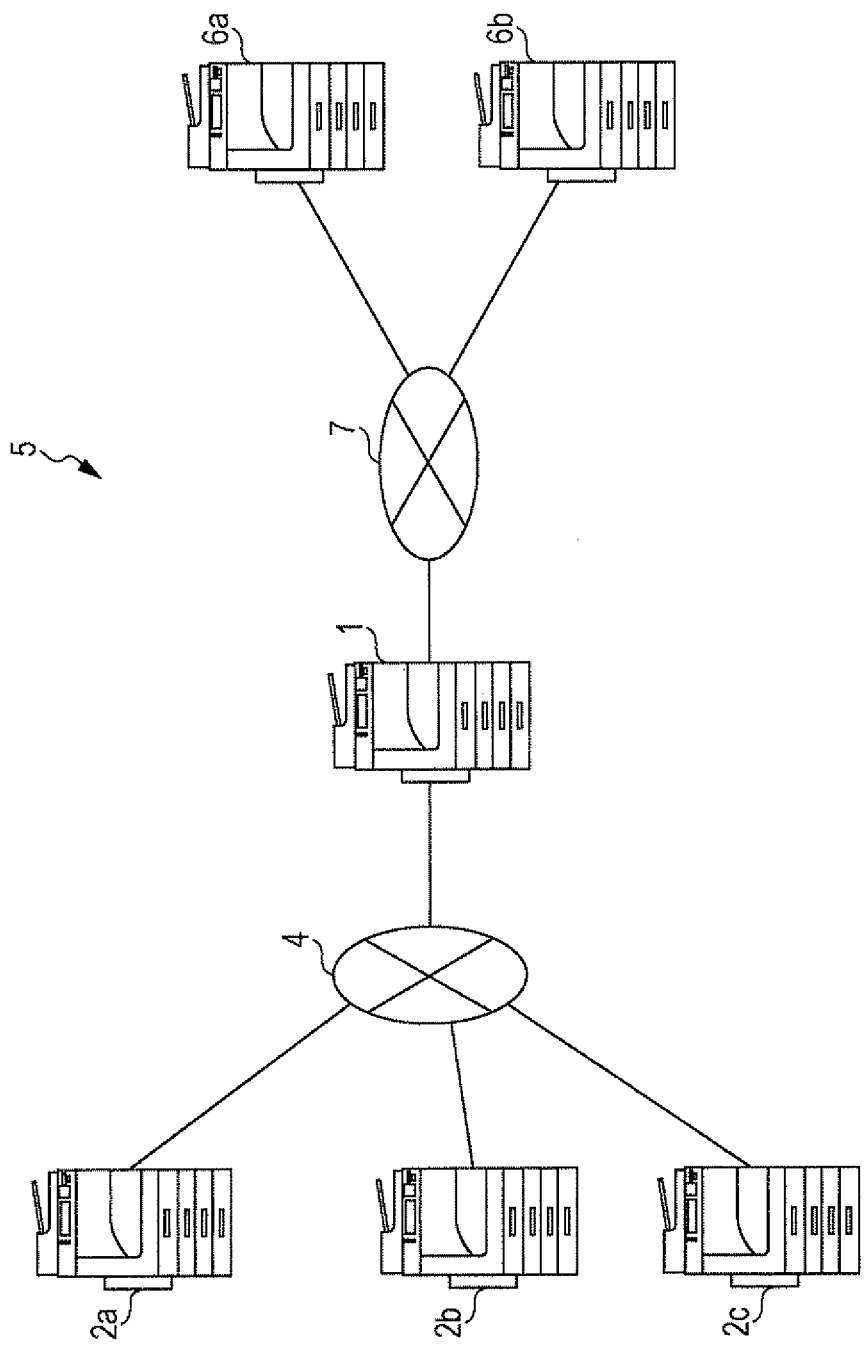
FIG. 1 is a schematic diagram illustrating an exemplary configuration of a communication system according to a first exemplary embodiment of the present invention.

FIG. 1 is a schematic diagram illustrating an exemplary configuration of a communication system according to a first exemplary embodiment of the present invention.

In the communication system 5, a relay device 1 and client devices 2a to 2c are communicably connected to each other by a private network 4. In addition, the relay device 1 is communicably connected to external devices 6a and 6b via a public network 7, with information being transmitted and received between the external devices 6a and 6b primarily by facsimile (hereinafter called "fax").

The relay device 1 is a device that includes fax transmitting and receiving functions as well as printer, scanner, and copier functions, and is equipped with electronic components such as a central processing unit (CPU) and flash memory that include functions for processing information. Although the relay device 1 is able to transmit a fax by itself, this exemplary embodiment will describe the case of transmitting a fax according to fax transmission instructions from the client devices 2a to 2c on the basis of the Internet fax (iFax) standard.

The client devices 2a to 2c are devices that include printer, scanner, and copier functions, but do not include fax transmitting and receiving functions, and are equipped with electronic components such as a CPU and flash memory that include functions for processing information. The client devices 2a to 2c issue fax transmission instructions to the relay device 1.

The private network 4 is a communication network capable of high-speed communication, and is a wired or wireless communication network such as an intranet or local area network (LAN).

The external devices 6a and 6b are arbitrary information processing devices that include fax transceiving functions, such as printers or PCs, for example.

The public network 7 is, for example, a paid communication network operated by a communication company, and may be an external network such as the public switched telephone network (PSTN) or a public IP network.

Hereinafter, a case will be described in which the client devices 2a to 2c issue fax transmission instructions to the relay device 1, causing faxes to be batch transmitted and received to and from multiple destinations (hereinafter designated "broadcast transmission"). Note that although a document batch transmitted to multiple destinations is shared in common, a shared template may also be used to modify the content for each destination.

Figure 2:
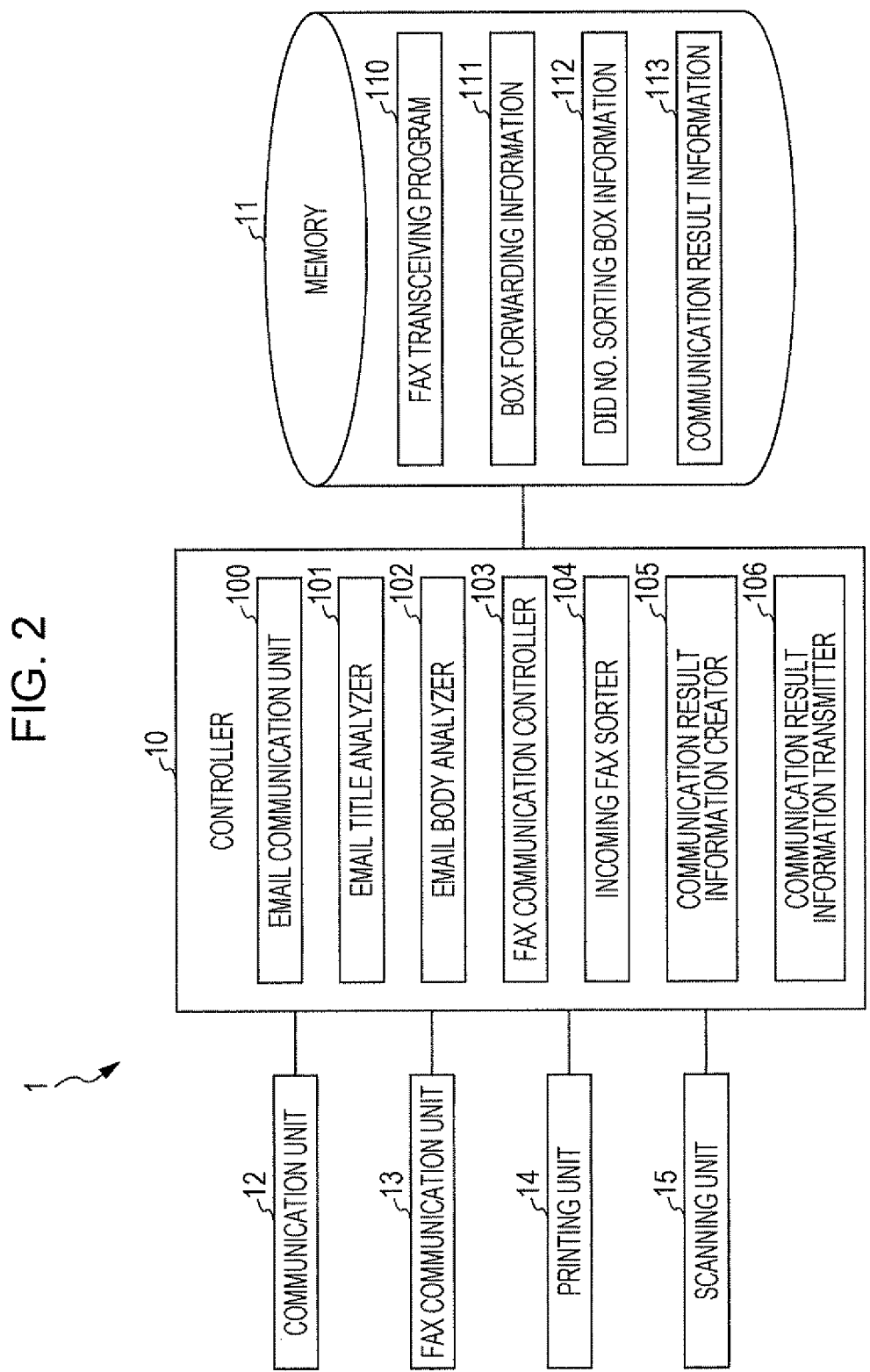
FIG. 2 is a block diagram illustrating an exemplary configuration of a relay device.

FIG. 2 is a block diagram illustrating an exemplary configuration of the relay device 1.

The relay device 1 is equipped with a controller 10, made up of a CPU or the like, that controls respective units in addition to executing various programs, memory 11 made up of a memory medium such as flash memory that stores information, a communication unit 12 that communicates with external devices via the private network 4, a fax communication unit 13 that communicates by fax with external devices via the public network 7, a printing unit 14 that prints onto a paper sheet, and a scanning unit 15 that optically scans a paper sheet having information such as text and images written thereon. The relay device 1 may additionally include a display that displays information such as text and images, and an operating unit used to operate the relay device 1.

By executing a fax transceiving program 110 discussed later, the controller 10 functions as an email communication unit 100, an email title analyzer 101, an email body analyzer 102, a fax communication controller 103, an incoming fax sorter 104, a communication result information creator 105, a communication result information transmitter 106, and the like.

The email communication unit 100 transmits and receives email to and from the client devices 2a to 2c via the private network 4. The email communication unit 100 also functions as a receiver that receives emails including Internet fax transmission instructions in particular.

The email title analyzer 101 analyzes information such as the destination of a fax transmission from Internet fax transmission instructions included in the title of an email received by the email communication unit 100.

The email body analyzer 102 analyzes the body text of an email received by the email communication unit 100 to extract fax transmission settings.

The fax communication controller 103 controls the fax communication unit 13 to transmit and receive image information of a document in fax format.

The incoming fax sorter 104 sorts image information of a document received via the fax communication unit 13 into a sorting box according to the destination of that document.

The communication result information creator 105 collects information when the fax communication controller 103 transmits or receives image information of a document, such as the date and time when the document is transmitted or received, the other party of the communication, the time involved in the communication, the number of pages in the document, and whether or not communication finished normally. The communication result information creator 105 then uses this information to create communication result information 113.

The communication result information transmitter 106 transmits communication result information 113 created by the communication result information creator 105 to corresponding client devices 2a to 2c.

The memory 11 stores information such as the fax transceiving program 110 that causes the controller 10 to operate as the respective units 100 to 106 discussed above, box forwarding information 111, direct inward dialing (DID) number sorting box information 112, and communication result information 113.

The box forwarding information 111 is information that associates identifiers for sorting boxes that temporarily save image information of documents received as faxes with the IP addresses of forwarding destinations (the client devices 2a to 2c) assigned to each sorting box.

The DID number sorting box information 112 is information that associates phone numbers, which are destinations for image information of documents received as faxes, with identifiers for sorting boxes. Note that this configuration assumes that multiple phone numbers are registered in DID format in a relay device, and that the registered numbers are respectively associated with the client devices 2a to 2c.

The communication unit 12 transmits and receives data via the private network 4 according to a communication protocol such as TCP/IP, performing network-related control and controlling the transmitting and receiving of email.

The fax communication unit 13 includes the functionality of a modem that modulates and demodulates image data according to a facsimile protocol such as G3 or G4, and the functionality of an NCU that controls connections with the public network 7, and conducts fax communication via the public network 7.

Figure 3:
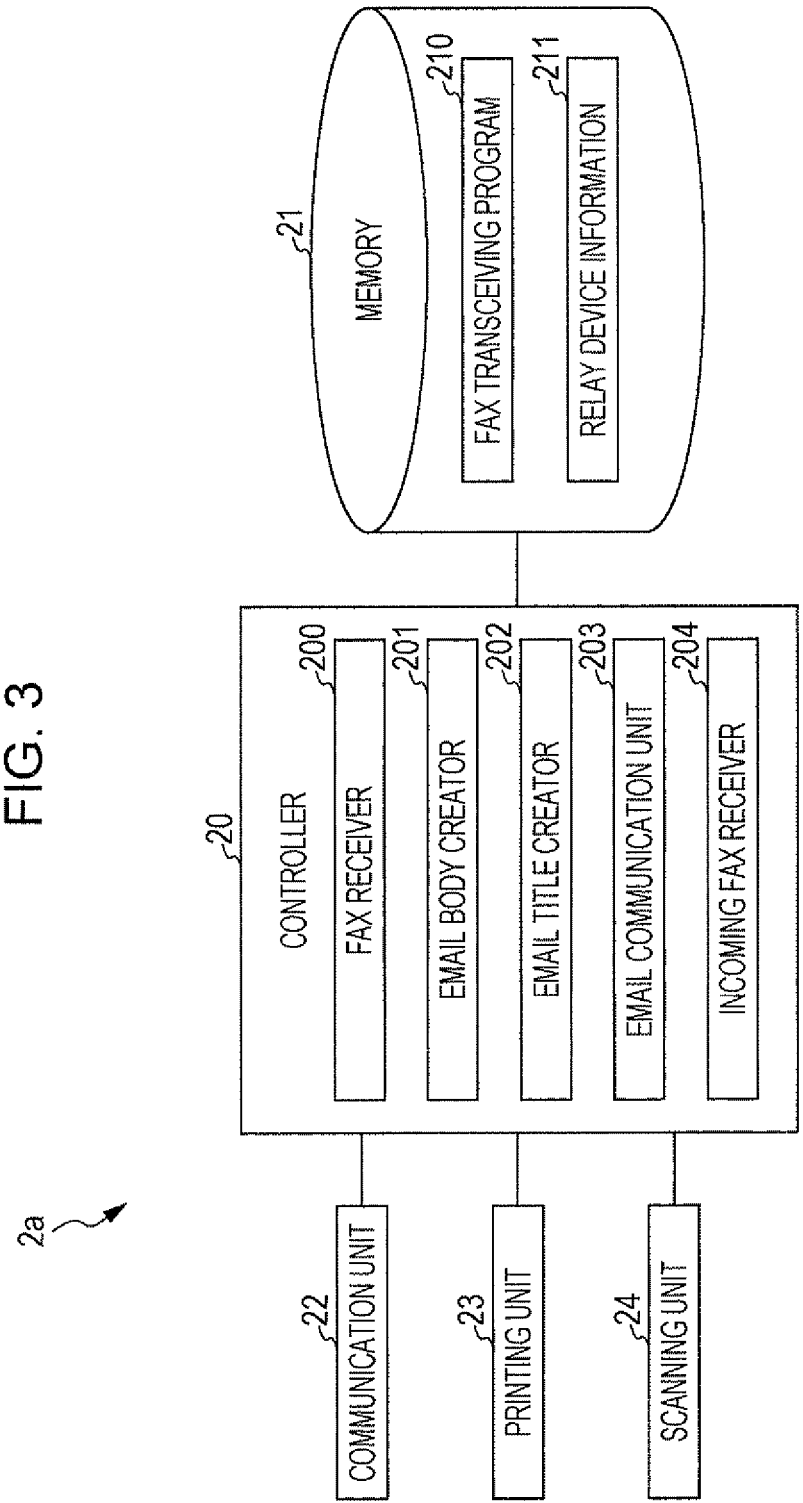
FIG. 3 is a block diagram illustrating an exemplary configuration of a client device.

FIG. 3 is a block diagram illustrating an exemplary configuration of the client devices 2a to 2c. Since the configuration of the client devices 2a to 2c is shared, the client device 2a will be described as a representative example.

The client device 2a is equipped with a controller 20, made up of a CPU or the like, that controls respective units in addition to executing various programs, memory 21 made up of a memory medium such as flash memory that stores information, a communication unit 22 that communicates with external devices via the private network 4, a printing unit 23 that prints onto a paper sheet, and a scanning unit 24 that optically scans a paper sheet having information such as text and images written thereon. The client device 2a may additionally include a display that displays information such as text and images, and an operating unit used to operate the relay device 1.

By executing a fax transceiving program 210 discussed later, the controller 20 functions as a fax receiver 200, an email body creator 201, an email title creator 202, an email communication unit 203, an incoming fax receiver 204, and the like.

The fax receiver 200 receives a fax transmission request from the user of the client device 2a. Note that a fax transmission request is input together with a destination phone number as a result of the user operating an operating unit (not illustrated), while a document to be faxed is scanned by the scanning unit 24.

The email body creator 201 creates the body text of an email to be transmitted to the relay device 1, on the basis of a fax transmission request and a destination phone number received by the fax receiver 200.

The email title creator 202 creates the title of an email to be transmitted to the relay device 1, on the basis of a fax transmission request and a destination phone number received by the fax receiver 200.

The email communication unit 203 transmits and receives email to and from the relay device 1 via the private network 4.

The incoming fax receiver 204 receives, via the private network 4, a fax saved to a sorting box corresponding to the client device 2a from among faxes temporarily saved in the relay device 1.

The memory 21 stores information such as the fax transceiving program 210 that causes the controller 20 to operate as the respective units 200 to 204 discussed above, and relay device information 211.

The relay device information 211 is information on the IP address of a relay device to which the client device 2a is able to transmit fax transmission instructions.

(Operation of Communication System)

Hereinafter, operation of a communication system 5 according to the first exemplary embodiment will be described with reference to FIGS. 1 to 5, with the description divided into (1) basic operation, (2) creating communication result information, and (3) transmitting communication result information. Note that the case of the client device 2a transmitting faxes by broadcast transmission via the relay device 1 will be described as representative of the client devices 2a to 2c.

(1) Basic Operation

First, a user of a client device 2a operates an operating unit (not illustrated) of the client device 2a, and prepares a fax.

The fax receiver 200 of the client device 2a starts receiving a fax transmission request in response to the user operations, and receives a destination phone number while also prompting the user to place a document to be faxed on a platen of the scanning unit 24 of the client device 2a.

The user inputs a destination phone number, and in addition, places a document on the platen and operates the operating unit to cause the scanning unit 24 to scan the document.

The fax receiver 200 of the client device 2a optically scans the document with the scanning unit 24 and generates image information.

Next, the email body creator 201 creates the body text of an email to be transmitted to the relay device 1, on the basis of a fax transmission request and a destination phone number received by the fax receiver 200. In the first exemplary embodiment, information indicating broadcast transmission is input into the email body.

In addition, the email title creator 202 creates the title of an email to be transmitted to the relay device 1, on the basis of a fax transmission request and a destination phone number received by the fax receiver 200.

The email title states "FAX=044BBB1111@ [192.168.1.33]", for example. This indicates that fax transmission instructions with respect to the phone number "044BBB1111" are issued to the relay device 1 at the IP address "192.168.1.33". Note that since broadcast transmission is used, assume that there are multiple destination phone numbers.

Next, the email communication unit 203 attaches image information to the email created by the email body creator 201 and the email title creator 202, and transmits the resulting email to the relay device 1.

(2) Creating Communication Result Information

Figure 5:
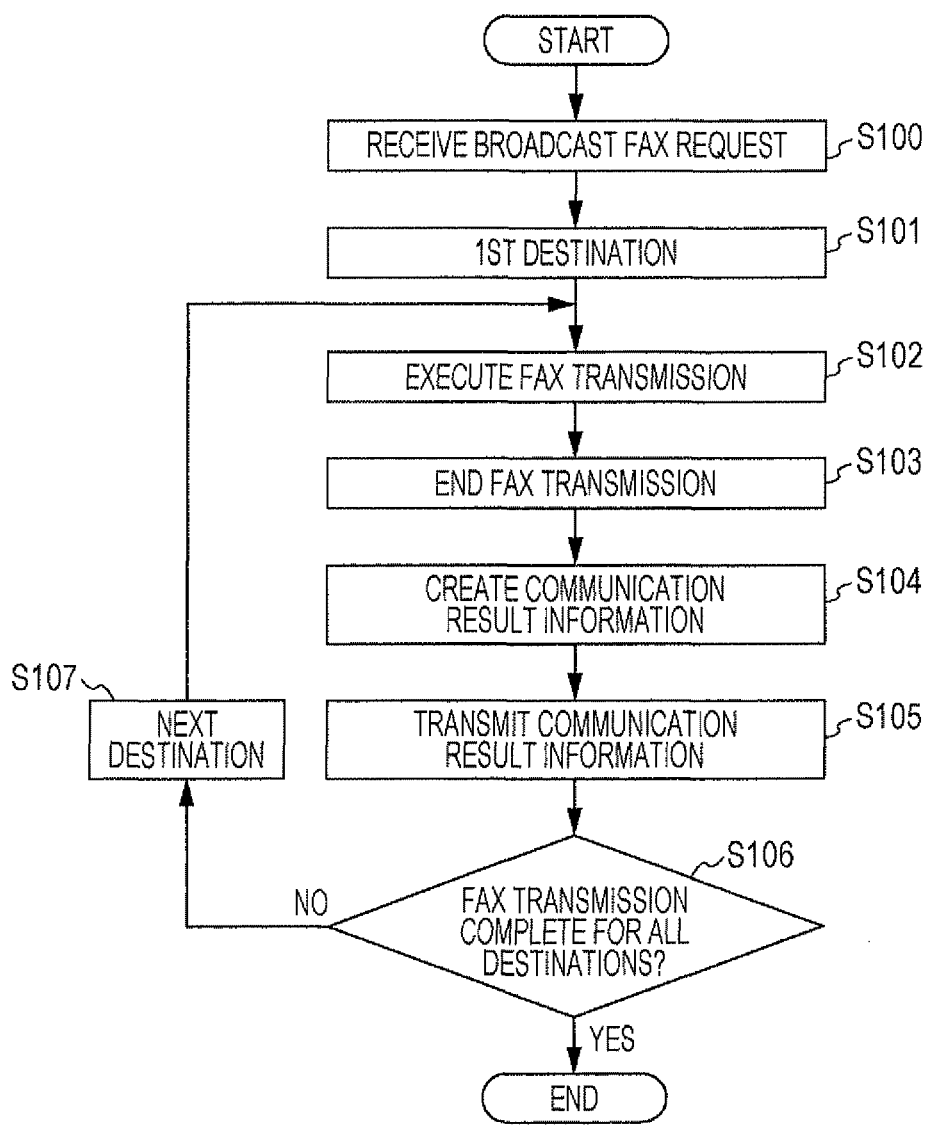
FIG. 5 is a flowchart for explaining an example of operations by which a relay device creates and transmits communication result information to a client device.

FIG. 5 is a flowchart for explaining an example of operations by which a relay device creates and transmits communication result information to a client device.

The email communication unit 100 of the relay device 1 receives the email transmitted by the client device 2a (S100), and the email title analyzer 101 analyzes the email title "FAX=044BBB1111@[192.168.1.33]" and recognizes that "044-BBB-1111" is the destination fax number. Note that since broadcast transmission is used, assume that there are multiple destination phone numbers.

Next, the fax communication controller 103 selects the first destination (S101), and transmits a fax of the image information attached to the email to the phone number "044-BBB-1111", for example (S102).

In the case where, in the above section "(1) Basic operation", the fax communication controller 103 transmits a fax of image information externally via the public network 7 and finishes operation (S103), the communication result information creator 105 creates information about that fax transmission in the memory 11 as communication result information 113 (S104).

FIG. 4 is a diagram illustrating an exemplary structure of the communication result information 113.

The communication result information 113a is an example of communication result information 113, and illustrates information about the receipt of faxes transmitted by the fax communication controller 103. The communication result information 113a includes a Broadcast Number field indicating a destination to which to broadcast a fax (individual number of destination/total number of destinations), a Fax Destination field indicating a phone number to fax, a Communication Result field indicating the state of fax transmission, and a Pages field indicating the number of pages to fax.

As illustrated in FIG. 4, the fax transmission with the broadcast number "1/20" indicates that the destination is the phone number "03-1234-5678", the number of pages is "5", and the communication result is "OK", for example. Meanwhile, the fax transmission with the broadcast number "3/20" indicates that the destination is the phone number "03-1234-9999", the number of pages is "3", and that transmission failed partway through without transmitting all five pages, yielding the communication result "NG" (meaning failure). Also, the fax transmission with the broadcast number "4/20" indicates that the destination is the phone number "03-1234-5678", the number of pages is "2", and that all five pages are in the middle of being transmitted, yielding the communication result "CALLING", which indicates that communication is currently in progress.

(3) Transmitting Communication Result Information

The communication result information transmitter 106 of the relay device 1 transmits the communication result information 113a to the client device 2a (S105).

Next, in the case where fax transmission is not complete for all destinations (S106), the fax communication controller 103 selects the next destination (S107) and executes steps S102 to S105.

In other words, in the first exemplary embodiment, the communication result information creator 105 creates communication result information 113 when transmission completes one by one for each of the multiple destinations in a broadcast transmission, and the communication result information transmitter 106 transmits the created information each time communication result information 113 is created.

Note that the communication result information creator 105 may also create communication result information 113 for destinations with failed transmissions from among the multiple destinations in a broadcast transmission. Additionally, the timings for the creation of communication result information 113 may be each time a transmission fails, or when a transmission fails even after retransmitting a predetermined number of times. The communication result information 113 may also state the number of times a transmission has failed.

Note that although the foregoing describes the case of transmitting faxes from the client device 2a by broadcast transmission via the relay device 1, the present invention is also applicable to cases that do not involve broadcast transmission.

Second Exemplary Embodiment

The second exemplary embodiment differs from the first exemplary embodiment in that communication result information is created and transmitted when the client device 2a queries the relay device 1 for the execution state. Note that hereinafter, structural elements shared in common with the first exemplary embodiment are denoted with the same reference signs, and the description of operation shared in common will be reduced or omitted.

Figure 6:
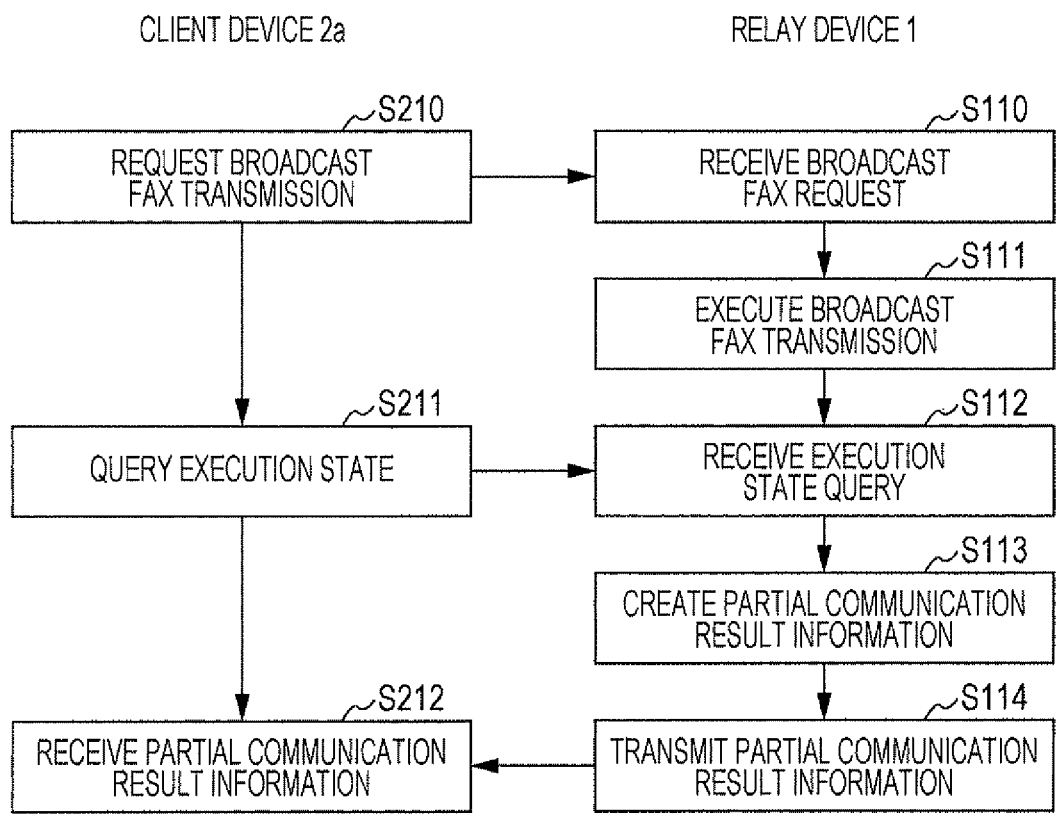
FIG. 6 is a flowchart for explaining another example of operations by which a relay device according to a second exemplary embodiment of the present invention creates and transmits communication result information to a client device.

FIG. 6 is a flowchart for explaining another example of operations by which a relay device according to a second exemplary embodiment of the present invention creates and transmits communication result information to a client device.

First, the email communication unit 203 of the client device 2a attaches image information 200a to an email created by the email body creator 201 and the email title creator 202, and transmits the resulting email to the relay device 1 (S210).

Next, the email communication unit 100 of the relay device 1 receives the email transmitted by the client device 2a (S110), and the email title analyzer 101 analyzes the email title.

Next, the fax communication controller 103 sequentially transmits faxes of the image information attached to the email, starting from the first destination (S111).

Next, in the case where the user of the client device 2a wants to query the execution state of the broadcast transmission, the user operates the client device 2a, and the client device 2a queries the relay device 1 for the execution state in response to the specific user operations (S211).

Next, when the relay device 1 receives the execution state query from the client device 2a (S112), the communication result information creator 105 creates partial progress communication result information 113 in the memory 11 regarding communication details on the faxes of image information that the fax communication controller 103 transmitted externally via the public network 7 up until the receipt of the query (S113).

The communication result information transmitter 106 of the relay device 1 transmits the partial progress communication result information 113 to the client device 2a (S114).

The client device 2a receives the partial progress communication result information 113 (S212).

Note that in the case of receiving an execution state query, the fax communication controller 103 of the relay device 1 may suspend or abort fax transmission, or simply continue fax transmission.

Third Exemplary Embodiment

The third exemplary embodiment differs from the first exemplary embodiment in that communication result information is created and transmitted when a fixed amount of time has elapsed since the client device 2a started a broadcast transmission.

Figure 7:
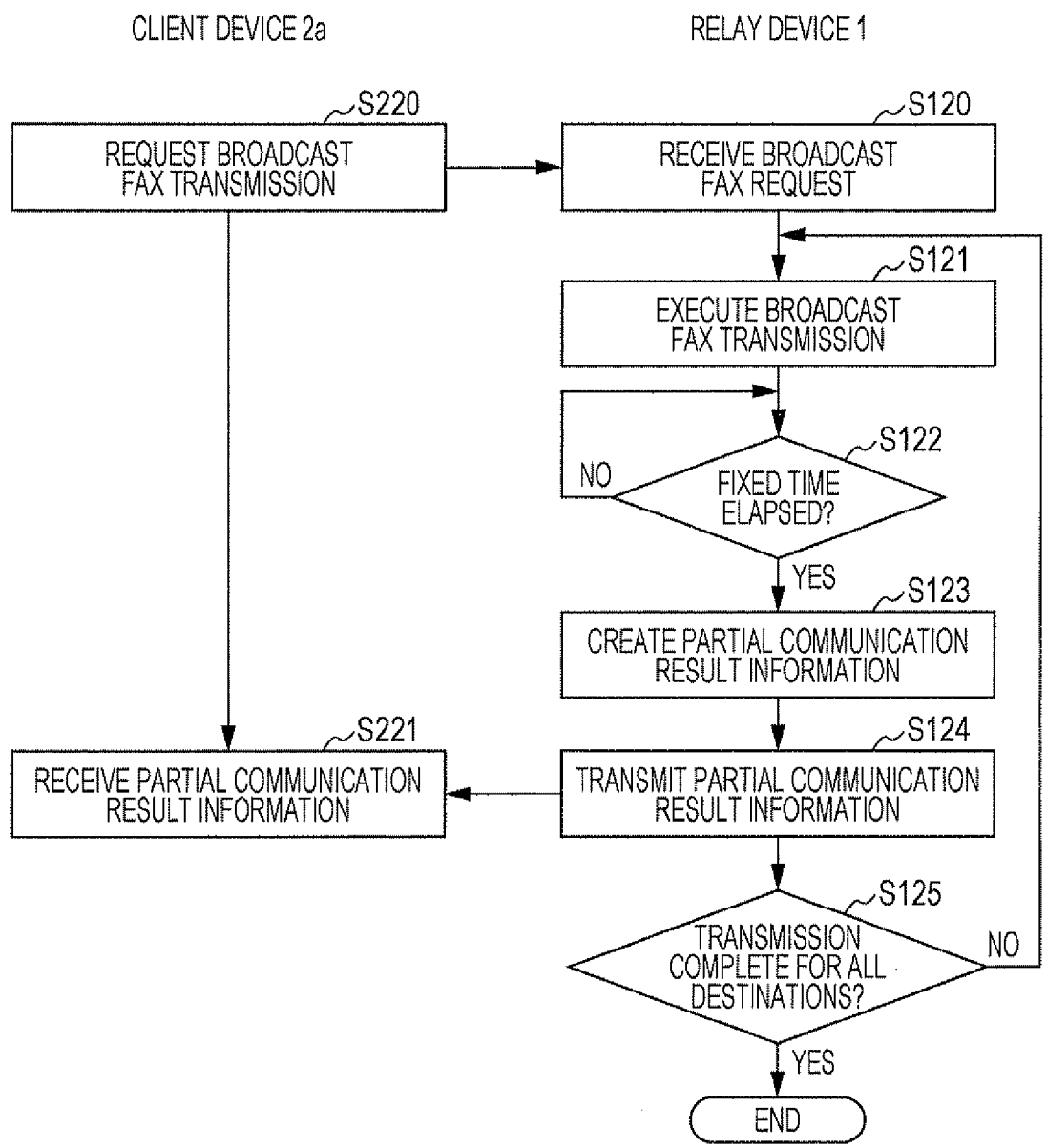
FIG. 7 is a flowchart for explaining another example of operations by which a relay device according to a third exemplary embodiment of the present invention creates and transmits communication result information to a client device.

FIG. 7 is a flowchart for explaining another example of operations by which a relay device according to a third exemplary embodiment of the present invention creates and transmits communication result information to a client device.

First, the email communication unit 203 of the client device 2a attaches image information 200a to an email created by the email body creator 201 and the email title creator 202, and transmits the resulting email to the relay device 1 (S220).

Next, the email communication unit 100 of the relay device 1 receives the email transmitted by the client device 2a (S120), and the email title analyzer 101 analyzes the email title.

Next, the fax communication controller 103 sequentially transmits faxes of the image information attached to the email, starting from the first destination (S121).

Next, when a predetermined amount of time elapses at the relay device 1 (S122; Yes), the communication result information creator 105 creates partial progress communication result information 113 in the memory 11 regarding communication details on the faxes of image information that the fax communication controller 103 transmitted externally via the public network 7 up until the predetermined amount of time elapsed (S123).

The communication result information transmitter 106 of the relay device 1 transmits the partial progress communication result information 113 to the client device 2a (S124).

The client device 2a receives the partial progress communication result information 113 (S221).

The relay device 1 repeats steps S121 to S124 until broadcast transmission completes for all destinations (S125).

Fourth Exemplary Embodiment

The fourth exemplary embodiment differs from the first exemplary embodiment in that communication result information is created and transmitted when the relay device 1 executes a fax transmission for a priority destination specified at the client device 2a.

Figure 8:
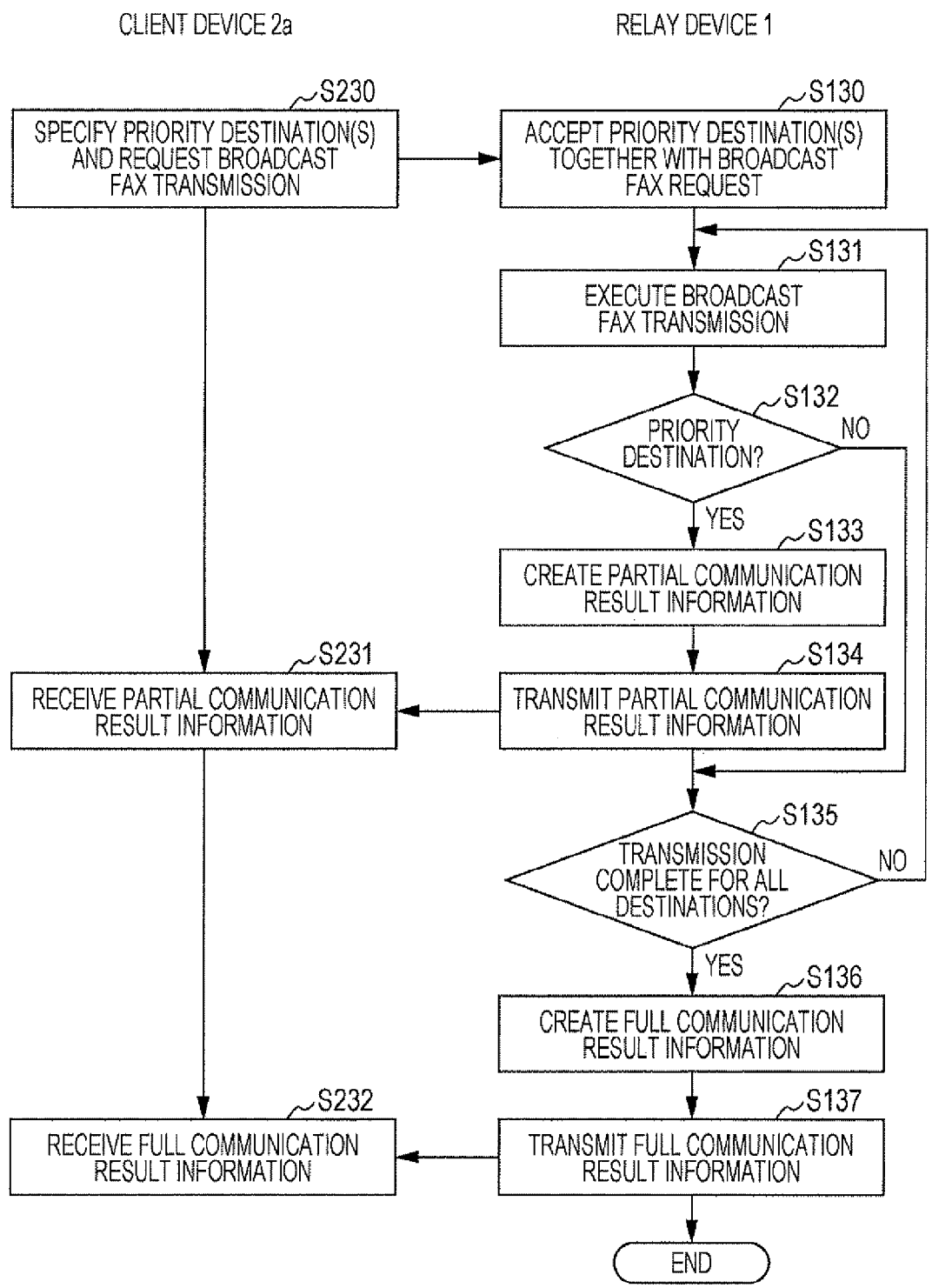
FIG. 8 is a flowchart for explaining another example of operations by which a relay device according to a fourth exemplary embodiment of the present invention creates and transmits communication result information to a client device.

FIG. 8 is a flowchart for explaining another example of operations by which a relay device according to a fourth exemplary embodiment of the present invention creates and transmits communication result information to a client device.

First, the email communication unit 203 of the client device 2a attaches image information 200a to an email created by the email body creator 201 and the email title creator 202, and transmits the resulting email to the relay device 1 (S230). Note that at this point, a destination for which the user wants to prioritize the transmission of communication result information is input as a priority destination in the body of the email. Note that in the case of multiple priority destinations, the multiple priority destinations may also be ranked.

Next, the email communication unit 100 of the relay device 1 receives the email transmitted by the client device 2a (S130), the email title analyzer 101 analyzes the email title, and the email body analyzer 102 analyzes the email body and simultaneously receives one or more priority destinations.

Next, the fax communication controller 103 sequentially transmits faxes of the image information attached to the email, starting from the first destination (S131).

In the case where the destination being processed is specified as a priority destination (S132; Yes), the communication result information creator 105 of the relay device 1 creates partial progress communication result information 113 in the memory 11 regarding communication details on the fax of image information that the fax communication controller 103 transmitted externally via the public network 7 to that priority destination (S133).

The communication result information transmitter 106 of the relay device 1 transmits the partial progress communication result information 113 to the client device 2a (S134).

The client device 2a receives the partial progress communication result information 113 (S231).

The relay device 1 executes steps S131 to S134 for all destinations (S135). Subsequently, the communication result information creator 105 of the relay device 1 creates partial progress communication result information 113 in the memory 11 regarding communication details on the faxes of image information that the fax communication controller 103 transmitted externally via the public network 7 to all destinations (S136).

The communication result information transmitter 106 of the relay device 1 transmits the communication result information 113 for all destinations to the client device 2a (S137).

The client device 2a receives the communication result information 113 for all destinations (S232).

Fifth Exemplary Embodiment

The fifth exemplary embodiment differs from the first exemplary embodiment in that communication result information is created and transmitted when the client device 2a requests the relay device 1 to abort execution.

Figure 9:
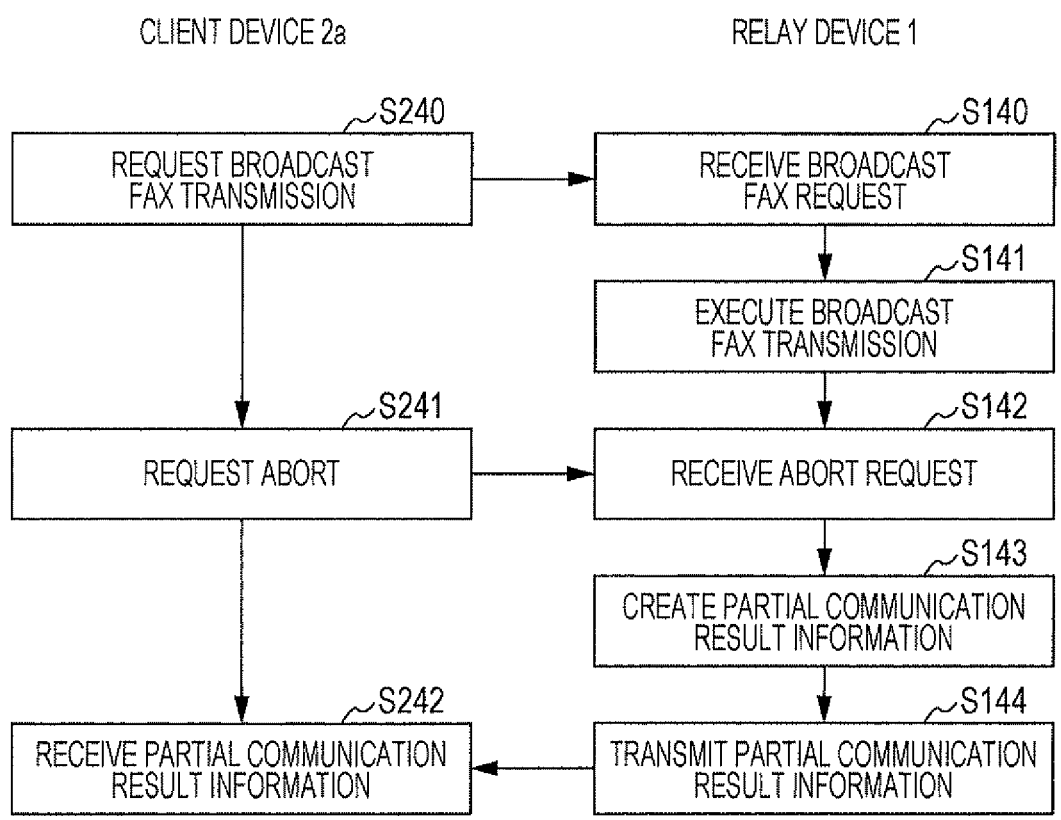
FIG. 9 is a flowchart for explaining another example of operations by which a relay device according to a fifth exemplary embodiment of the present invention creates and transmits communication result information to a client device.

FIG. 9 is a flowchart for explaining another example of operations by which a relay device according to a fifth exemplary embodiment of the present invention creates and transmits communication result information to a client device.

First, the email communication unit 203 of the client device 2a attaches image information 200a to an email created by the email body creator 201 and the email title creator 202, and transmits the resulting email to the relay device 1 (S240).

Next, the email communication unit 100 of the relay device 1 receives the email transmitted by the client device 2a (S140), and the email title analyzer 101 analyzes the email title.

Next, the fax communication controller 103 sequentially transmits faxes of the image information attached to the email, starting from the first destination (S141).

Next, in the case where the user of the client device 2a wants to abort the execution of the broadcast transmission, the user operates the client device 2a, and the client device 2a requests the relay device 1 to abort execution in response to the specific user operations (S241).

Next, when the relay device 1 receives the request to abort execution from the client device 2a (S142), the communication result information creator 105 creates partial progress communication result information 113 in the memory 11 regarding communication details on the faxes of image information that the fax communication controller 103 transmitted externally via the public network 7 up until the receipt of the request to abort execution (S143).

The communication result information transmitter 106 of the relay device 1 transmits the partial progress communication result information 113a to the client device 2a (S144).

The client device 2a receives the partial progress communication result information 113 (S242).

Sixth Exemplary Embodiment

The sixth exemplary embodiment differs from the first exemplary embodiment in that, in the case where the client device 2a requests the relay device 1 to suspend execution, and the execution details are modified, communication result information that includes the modified execution details is created and transmitted.

Figure 10:
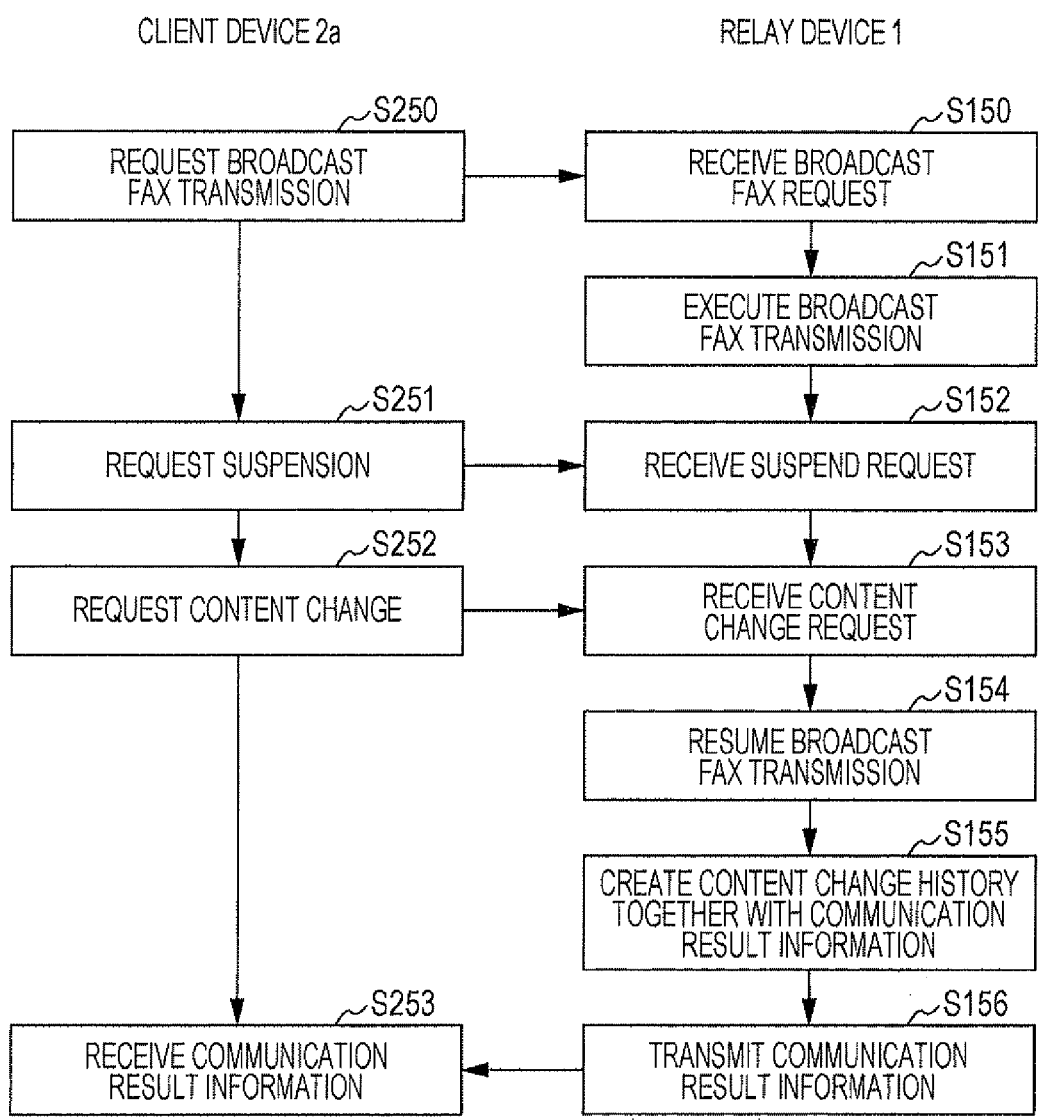
FIG. 10 is a flowchart for explaining another example of operations by which a relay device according to a sixth exemplary embodiment of the present invention creates and transmits communication result information to a client device.

FIG. 10 is a flowchart for explaining another example of operations by which a relay device according to a sixth exemplary embodiment of the present invention creates and transmits communication result information to a client device.

First, the email communication unit 203 of the client device 2a attaches image information 200a to an email created by the email body creator 201 and the email title creator 202, and transmits the resulting email to the relay device 1 (S250).

Next, the email communication unit 100 of the relay device 1 receives the email transmitted by the client device 2a (S150), and the email title analyzer 101 analyzes the email title.

Next, the fax communication controller 103 sequentially transmits faxes of the image information attached to the email, starting from the first destination (S151).

Next, in the case where the user of the client device 2a wants to suspend the execution of the broadcast transmission, the user operates the client device 2a, and the client device 2a requests the relay device 1 to suspend execution in response to the specific user operations (S251).

Next, the relay device 1 receives the request to suspend execution from the client device 2a (S152), and the fax communication controller 103 suspends the execution of the broadcast transmission. Note that communication result information for the partial progress of the execution state up until suspending execution may also be created and transmitted to the client device 2a.

Next, the user of the client device 2a changes some of the destinations for the broadcast transmission or changes the content of the image information, and thus the user operates the client device 2a, and the client device 2a requests the relay device 1 to change the content of the broadcast transmission in response to the specific user operations (S252).

Next, the relay device 1 receives the request to change content from the client device 2a (S153), and the fax communication controller 103 resumes the execution of the broadcast transmission on the basis of changed content (S154).

Next, when the broadcast transmission finishes, the communication result information creator 105 creates communication result information 113 in the memory 11, on the basis of the communication details on the faxes of image information that the fax communication controller 103 transmitted externally via the public network 7, and a history of the content changes (S155).

Next, the communication result information transmitter 106 of the relay device 1 transmits the communication result information 113 to the client device 2a (S156).

The client device 2a receives the communication result information 113 (S253).

Other Exemplary Embodiments

Note that the present invention is not limited to the foregoing exemplary embodiments, and that various modifications are possible within a scope that does not depart from the principal matter of the present invention.

Furthermore, the foregoing fax transceiving programs 110 and 210 may also be provided by being stored on a storage medium such as a CD-ROM, or by being downloaded to memory inside a device from a device such as a server connected to a network such as the Internet. In addition, all or part of the respective units 100 to 106 and the respective units 200 to 204 may be realized by hardware such as an ASIC. Note that the order of the respective steps indicated in the operational description of the foregoing exemplary embodiments may also be modified, and steps may also be added or removed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A relay device comprising:
 a receiver that receives a plurality of facsimile transmission instructions via a private network from a client device that does not include facsimile transmitting functions;

a facsimile communication unit that sequentially transmits facsimiles externally via a public network, on the basis of the plurality of facsimile transmission instructions received by the receiver;

a creator that, in response to satisfaction of a predetermined condition, creates partial communication result information regarding a transmission status of only the facsimiles which the facsimile communication unit has attempted to transmit from among the plurality of facsimile instructions, before the facsimile communication unit completes facsimile transmission over the public network for all of the plurality of facsimile transmission instructions; and a transmitter that transmits, for each facsimile transmission instruction, the partial communication result information created by the creator to the client device from which the receiver received facsimile transmission instructions, the communication result information being transmitted before communication result information of a next facsimile of the sequentially transmitted plurality of facsimile transmission instructions is generated.

2. The relay device according to claim 1, wherein
the plurality of facsimile transmission instructions received by the receiver are instructions for broadcast transmission that transmits common image information to different destinations, and
the creator creates communication result information each time the facsimile communication unit transmits a facsimile.

3. The relay device according to claim 1, wherein
the creator creates communication result information each time the facsimile communication unit transmits a facsimile, and the transmission fails.

4. The relay device according to claim 1, wherein
the creator creates communication result information when a query is received from the client device from which the receiver received facsimile transmission instructions.

5. The relay device according to claim 1, wherein
the receiver receives, from the client device, the plurality of facsimile transmission instructions in addition to prioritized facsimile transmission instructions from among the plurality of facsimile transmission instructions, and
the creator creates communication result information each time the facsimile communication unit transmits a facsimile on the basis of the prioritized facsimile transmission instructions.

6. The relay device according to claim 1, wherein
the creator creates communication result information in the case where the client device requests the facsimile communication unit to abort execution of facsimile transmission.

7. The relay device according to claim 1, wherein
the creator creates communication result information in the case where the client device requests the facsimile communication unit to suspend execution of facsimile transmission.

8. The relay device according to claim 7, wherein
in the case where, after the execution of facsimile transmission is suspended, the client device issues instructions to change the content of the facsimile transmission instructions and also to resume facsimile transmission, the creator creates communication result information in addition to the changed content of the facsimile transmission instructions.

9. A facsimile communication method comprising:
receiving a plurality of facsimile transmission instructions via a private network from a client device that does not include facsimile transmitting functions;
sequentially transmitting facsimiles externally via a public network, on the basis of the received plurality of facsimile transmission instructions;
creating, in response to satisfaction of a predetermined condition, partial communication result information regarding a transmission status of only the facsimiles which were transmitted from among the plurality of facsimile instructions, before facsimile transmission over the public network is completed for all of the plurality of facsimile transmission instructions; and
transmitting, for each facsimile transmission instruction, the created partial communication result information to the client device from which facsimile transmission instructions were received, the communication result information being transmitted before communication result information of a next facsimile of the sequentially transmitted plurality of facsimile transmission instructions is generated.

10. A non-transitory computer readable medium storing a program causing a computer to execute a process for facsimile communication, the process comprising:
receiving a plurality of facsimile transmission instructions via a private network from a client device that does not include facsimile transmitting functions;
sequentially transmitting facsimiles externally via a public network, on the basis of the received plurality of facsimile transmission instructions;
creating, in response to satisfaction of a predetermined condition, partial communication result information regarding a transmission status of only the facsimiles which were transmitted from among the plurality of facsimile instructions, before facsimile transmission over the public network is completed for all of the plurality of facsimile transmission instructions; and
transmitting, for each facsimile transmission instruction, the created partial communication result information to the client device from which facsimile transmission instructions were received, the communication result information being transmitted before communication result information of a next facsimile of the sequentially transmitted plurality of facsimile transmission instructions is generated.

* * * * *